(12) United States Patent
Mizusawa

(10) Patent No.: US 8,054,893 B2
(45) Date of Patent: Nov. 8, 2011

(54) OPTIMUM RADIO COMMUNICATION METHOD WITH RADIO FRAME VARIABLE CONTROL AND RADIO COMMUNICATION SYSTEM USING THE SAME

(75) Inventor: Hitoshi Mizusawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 858 days.

(21) Appl. No.: 11/984,964

(22) Filed: Nov. 26, 2007

(65) Prior Publication Data

US 2008/0123762 A1   May 29, 2008

(30) Foreign Application Priority Data

Nov. 29, 2006   (JP) .................................. 2006-322269

(51) Int. Cl.
*H04L 27/00* (2006.01)
(52) U.S. Cl. ........ 375/259; 375/224; 375/285; 375/296; 375/316; 370/241; 370/252
(58) Field of Classification Search .................. 375/224, 375/259–260, 285, 296, 316, 346; 370/241, 370/252
See application file for complete search history.

(56) References Cited

U.S. PATENT DOCUMENTS

| | | | | |
|---|---|---|---|---|
| 7,145,876 B2 * | 12/2006 | Huang et al. | ................... | 370/232 |
| 7,317,747 B2 * | 1/2008 | Miyazaki et al. | ............. | 375/136 |
| 7,710,910 B2 * | 5/2010 | Ode et al. | ....................... | 370/323 |
| 7,764,643 B2 * | 7/2010 | Mizusawa | ...................... | 370/328 |
| 2005/0094552 A1 | 5/2005 | Abe et al. | | |
| 2006/0172704 A1 | 8/2006 | Nishio et al. | | |
| 2007/0165731 A1 * | 7/2007 | Xiao et al. | ..................... | 375/260 |
| 2007/0177494 A1 * | 8/2007 | Tomizawa | ..................... | 370/208 |
| 2007/0178928 A1 * | 8/2007 | Ode | .............................. | 455/522 |

FOREIGN PATENT DOCUMENTS

| | | |
|---|---|---|
| JP | 2003-174426 | 6/2003 |
| JP | 2005027294 | 1/2005 |
| JP | 2005-345325 | 12/2005 |
| JP | 2007514352 | 5/2007 |
| WO | 2005015797 A1 | 2/2005 |
| WO | 2005060298 A1 | 6/2005 |

OTHER PUBLICATIONS

NEC Group, Physical channel mapping for uni-cast, TSG-RAN WG1 LTE Ad hoc R1-060056, Jan. 23, 2006.
Japanese Notification of Reason for Rejection dated Jul. 12, 2011 for application No. 2006-322269.

* cited by examiner

*Primary Examiner* — Jean B Corrielus
(74) *Attorney, Agent, or Firm* — Murphy & King, P.C.

(57) ABSTRACT

Not only pilot channel symbols but also control channel symbols can be flexibly decreased in a radio communication system, which includes a transmission side apparatus transmitting a data frame where a plurality of continuous or discontinuous frequency areas are assigned to one transfer time block and a frame is formed of a predetermined number of transfer time blocks; and a reception side apparatus receiving a data frame from the transmission side apparatus, The transmission side apparatus transmits to the reception side apparatus a data frame which has a common pilot channel and a control channel in the beginning of the frame, the reception side apparatus measures a received quality of the data frame, decides a frame type based on the measured received quality and notifies the decided frame type to the transmission side apparatus. The transmission side apparatus sends subsequent frame data to the reception side apparatus in use of a frame format corresponding to the notified frame type.

3 Claims, 12 Drawing Sheets

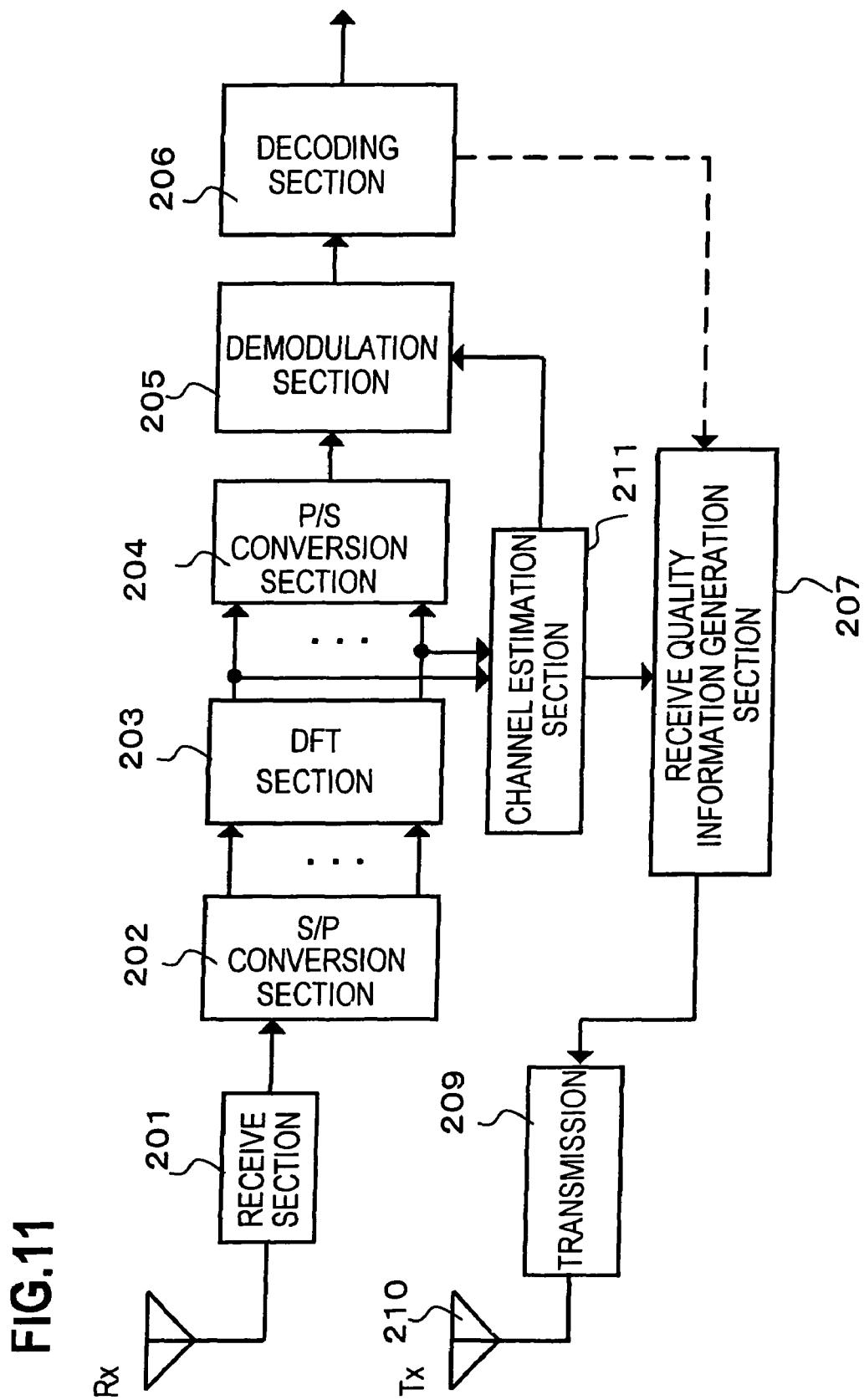

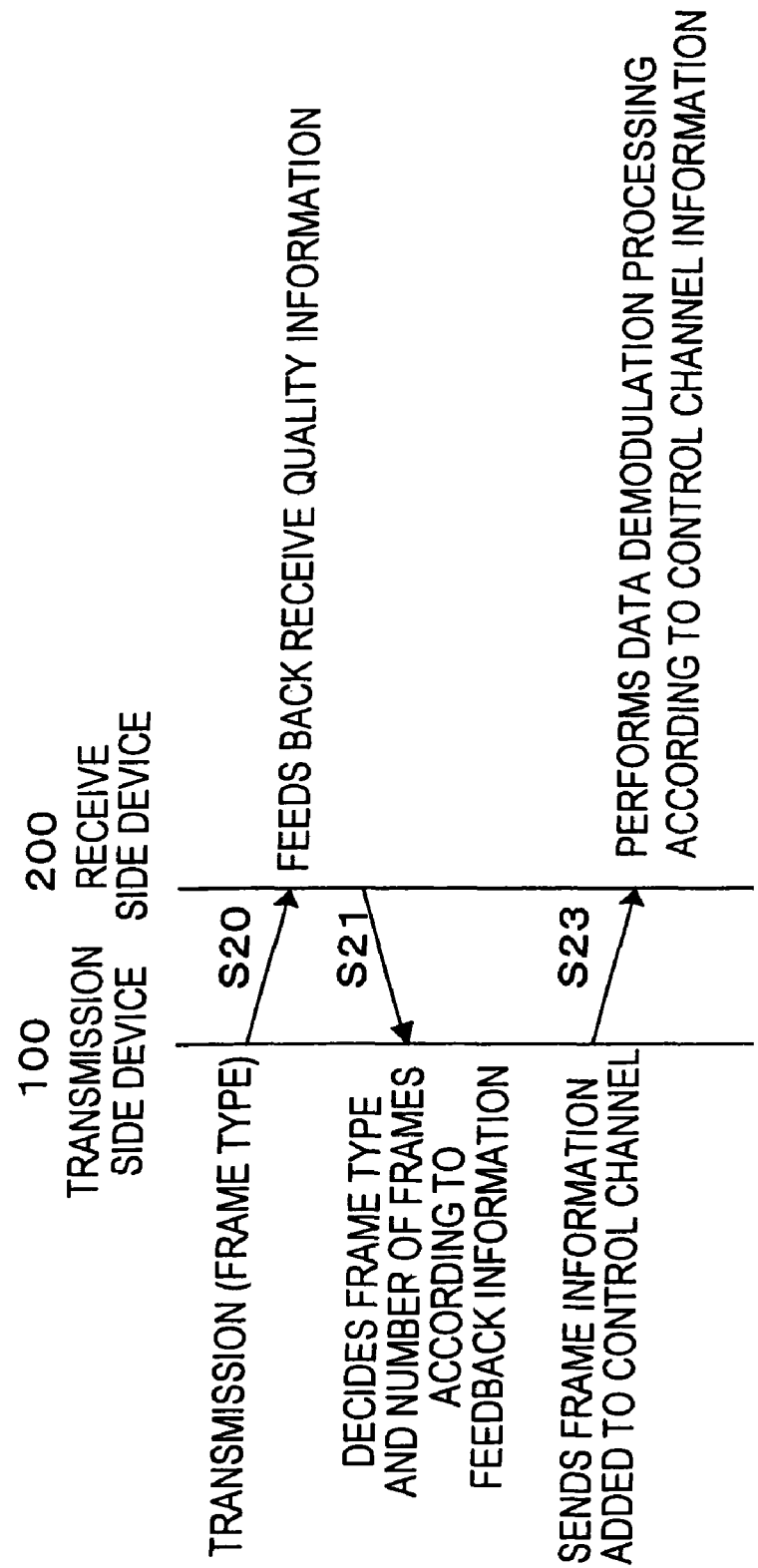

OPTIMUM RADIO COMMUNICATION METHOD WITH RADIO FRAME VARIABLE CONTROL AND RADIO COMMUNICATION SYSTEM USING THE SAME

CROSS-REFERENCE TO RELATED APPLICATIONS

This application is based upon and claims the benefit of priority from the prior Japanese Patent Application No. 2006-322269, filed on Nov. 29, 2006, the entire contents of which are incorporated herein by reference.

BACKGROUND OF THE INVENTION

1. Field of the Invention

The present invention relates to an optimum radio communication method with a radio frame variable control and a radio communication system using the method.

2. Description of the Related Art

FIG. 1 is a diagram depicting a radio format of which specification is standardized by 3GPP (Third Generation Partnership Project) as an international standard of a third generation high-speed mobile communication system.

In FIG. 1, only the n-th frame is shown. This means that the (n−1)th frame and the (n+1)th frame, which are not illustrated, continue before and after the n-th frame.

In FIG. 1, a plurality if continuous or discontinuous areas are assigned in the vertical direction, that is the frequency axis direction. Since the frequency area is frequency-divided so that the phases are orthogonal to each other, interference does not occur.

In the horizontal direction, that is, in the time direction, a plurality of OFDM (Orthogonal Frequency Division Multiplex) symbols is disposed to constitute one frame.

Here one OFDM symbol corresponds to one TTI (Transmission Time Interval).

In the beginning of each frame in the time axis direction, a common pilot channel 1 and a control channel 2 are disposed in the frequency axis direction as a set. These are of the set corresponding to each user or to each different channel.

This common pilot channel 1 indicates the delimit of a sub-frame, and provides all the users with the timing to calculate SNR (Signal to Noise Ratio) and a receiving level using the pilot. The control channel 2 has a demodulated information corresponding to the modulation method of the signal data.

In this way, the conventional configuration uses a fixed frame format having common the pilot channel 1 and the control channel 2 for each frame.

If such a fixed frame format is used, however, it is difficult to respond appropriately in a mobile communication system, even if the line speed could be increased depending on the line status between the transmission side apparatus (base station) and the reception side apparatus (mobile terminal).

With the foregoing in view, the present applicant proposed to improve a channel estimation accuracy and improve the throughput of the entire base station by using an appropriate frame pattern (Japanese Patent Application Laid-Open No. 2005-345325).

This invention disclosed in Japanese Patent Application Laid-Open No. 2005-345325 however is for controlling the number of distributed pilot channels among the frames. For example, deterioration of the throughput of the base station is prevented by adjusting the number of pilot channel symbols for a terminal moving at a low-speed, or decreasing the number of distributed pilot channel symbols among the frames.

SUMMARY OF THE INVENTION

Therefore it is an object of the present invention to provide an optimum radio communication method by a radio frame variable control which can more flexibly decrease the distributed number of not only the pilot channel symbols, but also the control channel symbols, and a radio communication system using the method.

To achieve the above object, a first aspect of the present invention is a radio communication system having: a transmission side apparatus for transmitting a data frame where a plurality of continuous or discontinuous frequency areas are assigned to one transfer time block, and a frame is formed of a predetermined number of transfer time blocks; and a reception side apparatus for receiving a data frame from the transmission side apparatus, wherein the transmission side apparatus transmits to the reception side apparatus a data frame which has a common pilot channel and a control channel in the beginning of the frame, the reception side apparatus measures a receive quality of the data frame, decides a frame type based on the measured receive quality and notifies the decided frame type to the transmission side apparatus, and the transmission side apparatus sends the subsequent frame data to the reception side apparatus in use of a frame format corresponding to the notified frame type.

A second aspect is a radio communication system having: a transmission side apparatus for transmitting a data frame where a plurality of continuous or discontinuous frequency areas are assigned to one transfer time block and a frame is formed of a predetermined number of transfer time blocks; and a reception side apparatus for receiving a data frame from the transmission side apparatus, wherein the transmission side apparatus transmits to the reception side apparatus a data frame which has a common pilot channel and a control channel in the beginning of the frame, the reception side apparatus measures a receive quality of the frame and feeds back the measured receive quality to the transmission side apparatus, and the transmission side apparatus decides a frame type based on the fed back receive quality, and sends the subsequent frame data to the reception side apparatus in use of a frame format corresponding to the decided frame type.

In these aspects, the frame type which is decided based on the receive quality has a frame format which does not include at least the control channel out of the common pilot channel and control channel, and includes a number of frames that can sustain characteristics which are decided by comparing the receive quality with a threshold of receive quality which is set in advance.

Because of the above mentioned characteristics of the present invention, not only pilot channel symbols, but also control channel symbols can be flexibly decreased for a reception side apparatus of which receive quality is good. Therefore the decreased channel symbols can be replaced with data symbols, which allows more flexible high-speed data transmission.

BRIEF DESCRIPTION OF THE DRAWINGS

FIG. 11 is a block diagram depicting a configuration example of the reception side apparatus according to the second embodiment; and FIG. 12 is a flow chart depicting the processing sequence between the transmission side apparatus and the reception side apparatus according to the second embodiment.

DESCRIPTION OF THE PREFERRED EMBODIMENTS

Embodiments of the present invention will now be described with reference to the drawings. The embodiments are for assisting the understanding of the present invention, and not for limiting the application of the present invention to these embodiments.

Figure 2:
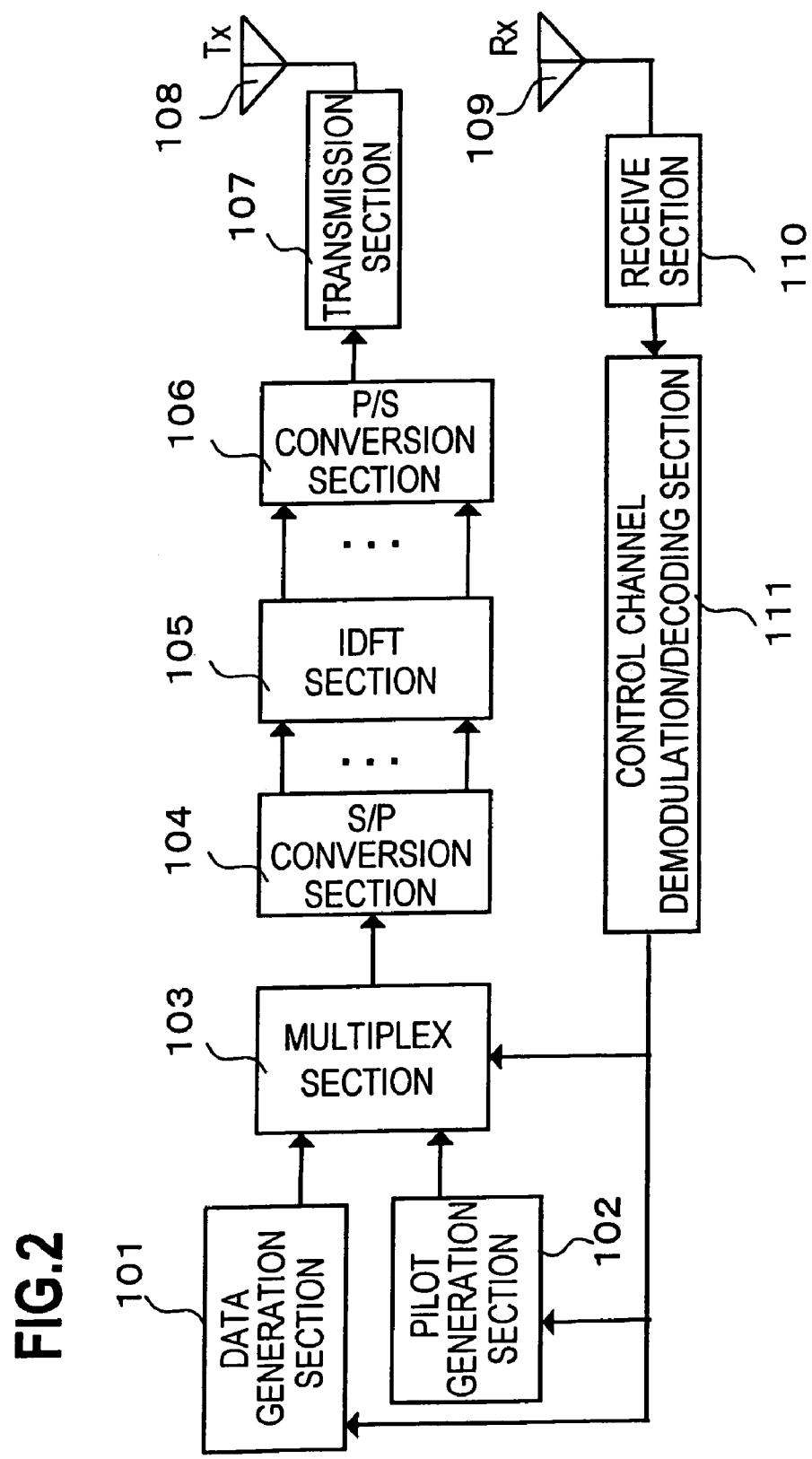
FIG. 2 is a block diagram depicting a general configuration of a transmission side apparatus of a first embodiment where an optimum radio communication method based on a radio frame variable control according to the present invention is applied.
Figure 3:
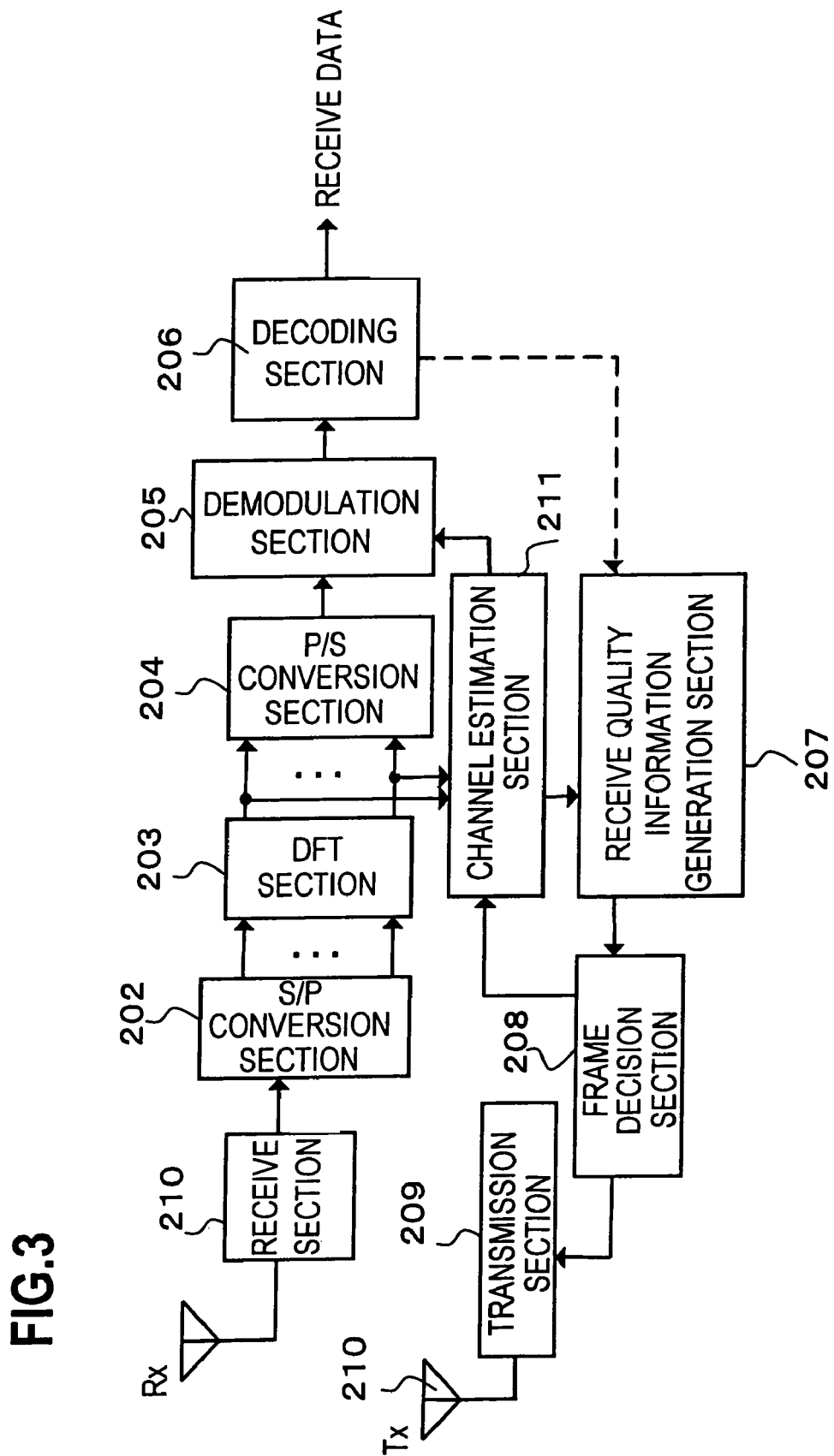
FIG. 3 is a block diagram depicting a general configuration of a reception side apparatus corresponding to the transmission side apparatus in FIG. 2.

FIG. 2 is a block diagram depicting a general configuration of a transmission side apparatus of the first embodiment, where an optimum radio communication method based on a radio frame variable control according to the present invention is applied. FIG. 3 is a block diagram depicting a general configuration of a reception side apparatus corresponding to the transmission side apparatus in FIG. 2.

As an embodiment, the transmission side apparatus in FIG. 2 is a base station apparatus, and the reception side apparatus in FIG. 3 is a mobile terminal.

Figure 4:
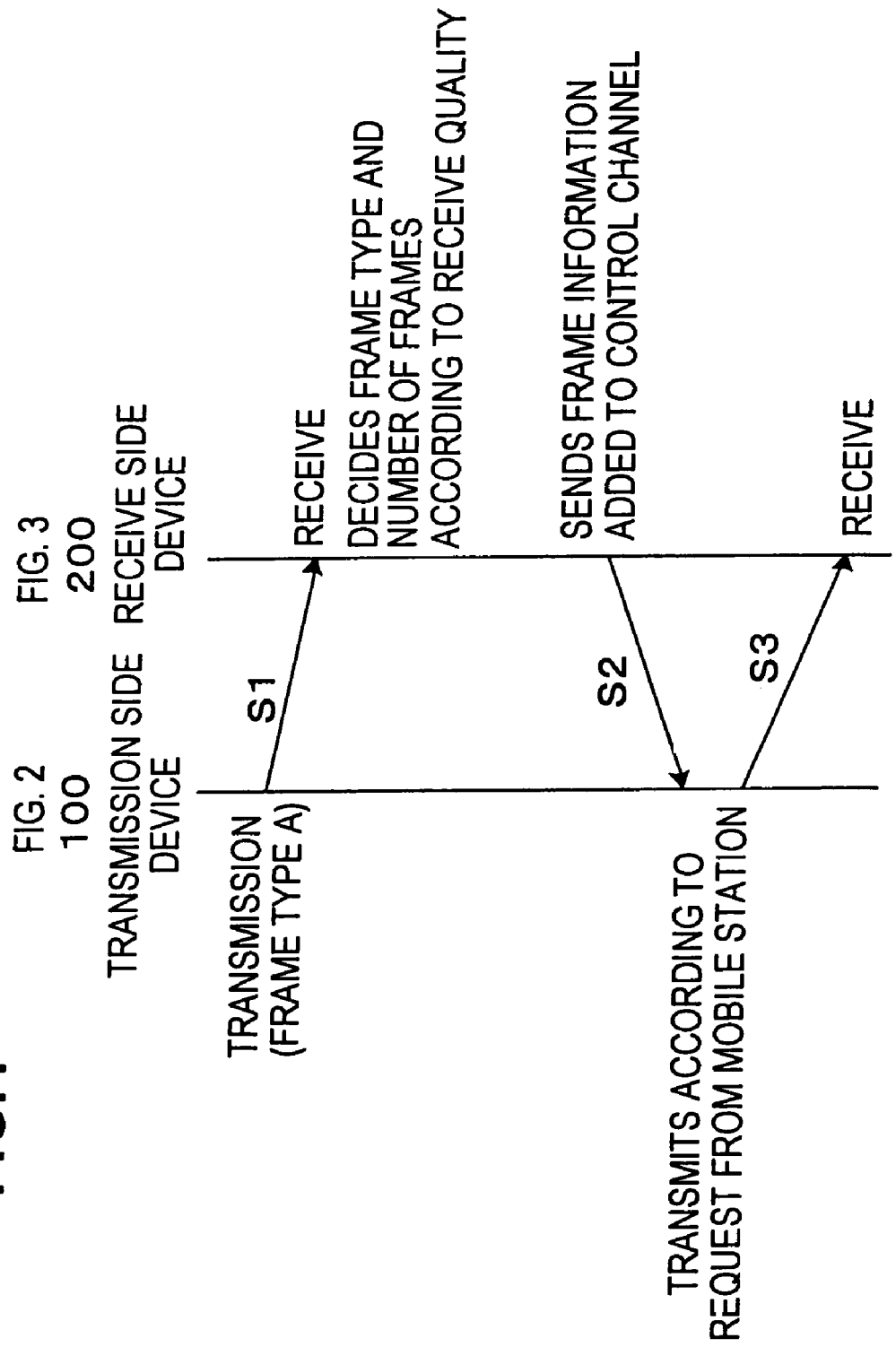
FIG. 4 is a flow chart depicting a processing sequence between the transmission side apparatus and the reception side apparatus according to the first embodiment.

FIG. 4 is a flow chart depicting a processing sequence between the transmission side apparatus and the reception side apparatus according to a first embodiment.

In FIG. 4, the transmission side apparatus 100 in FIG. 2 sends a frame signal with frame type A to the reception side apparatus 200 (step S1).

Figure 1:
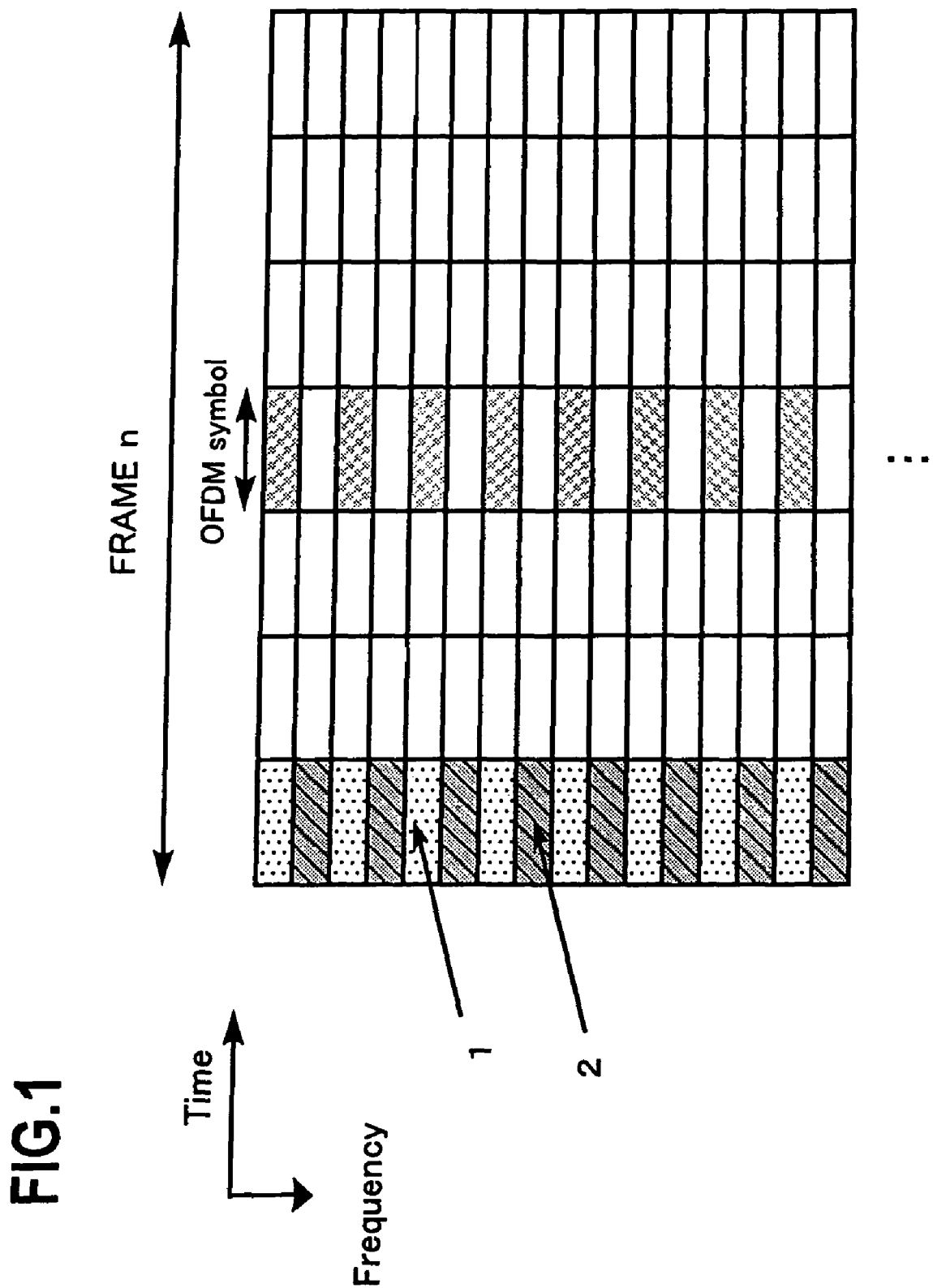
FIG. 1 is a diagram depicting a radio format of which specifications are standardized by 3GPP, as an international standard of a third generation high-speed mobile communication system.

Here the frame type A is a conventional frame format shown in FIG. 1, which has a common pilot channel 1 and a control channel 2 in the beginning of a frame.

The transmission side apparatus 100 shown in FIG. 2 generates a transmission data in a data generation section 101, and a pilot signal in a pilot generation section 102.

Then in a multiplex section 103, to which the transmission data and pilot signal are input, time division multiplexing is executed. A serial signal, generated after the time division multiplexing, is serial-parallel converted in an S/P conversion section 104. Then a parallel signal, generated after the serial-parallel conversion, is converted into a time series signal by an inverted discrete Fourier transform (IDFT) section 105, and is then converted into a serial signal in a P/S conversion section 106. This serial signal is modulated by a transmission section 107 using an appropriate modulation method, and is amplified in power, and then sent out from an antenna 108 as a transmission signal Tx.

Also in FIG. 2, receive processing is performed on a receive signal Rx received from an antenna 109. From a signal on which the receiving process is performed in a receiving section 110, a control channel is extracted in a demodulation/decoding section 111. Since this control channel includes such information as received level information in the reception side, multiplex processing, that is the setting of a frame type, is executed in the multiplex section 103 according to the present invention.

The configuration of the reception side apparatus 200 in FIG. 3 has virtually an opposite processing function from the transmission side apparatus in FIG. 2.

A receiving section 210, S/P conversion section 202, discrete Fourier transform (DFT) section 203, P/S conversion section 204, demodulation section 205 and decoding section 206 perform opposite functions to the processing functions of the transmission section 107, P/S conversion section 106, inverted discrete Fourier transform (IDFT) section 105, S/P conversion section 104, multiplex section 103 and data generation section 101 of the transmission side apparatus shown in FIG. 2 respectively. Therefore further description of these sections is omitted.

The configuration according to the present invention has a frame decision section 208 for deciding a frame type, which will be described later, based on the output of a received quality information generation section 207 for generating received quality information by referring to the signal level decoded by the decoding section 206. The frame information decided by the frame decision section 208 is sent by a transmission section 209 to the transmission side apparatus 100 via a transmission antenna 210.

The frame type according to the present invention will be described as follows.

Figure 5:
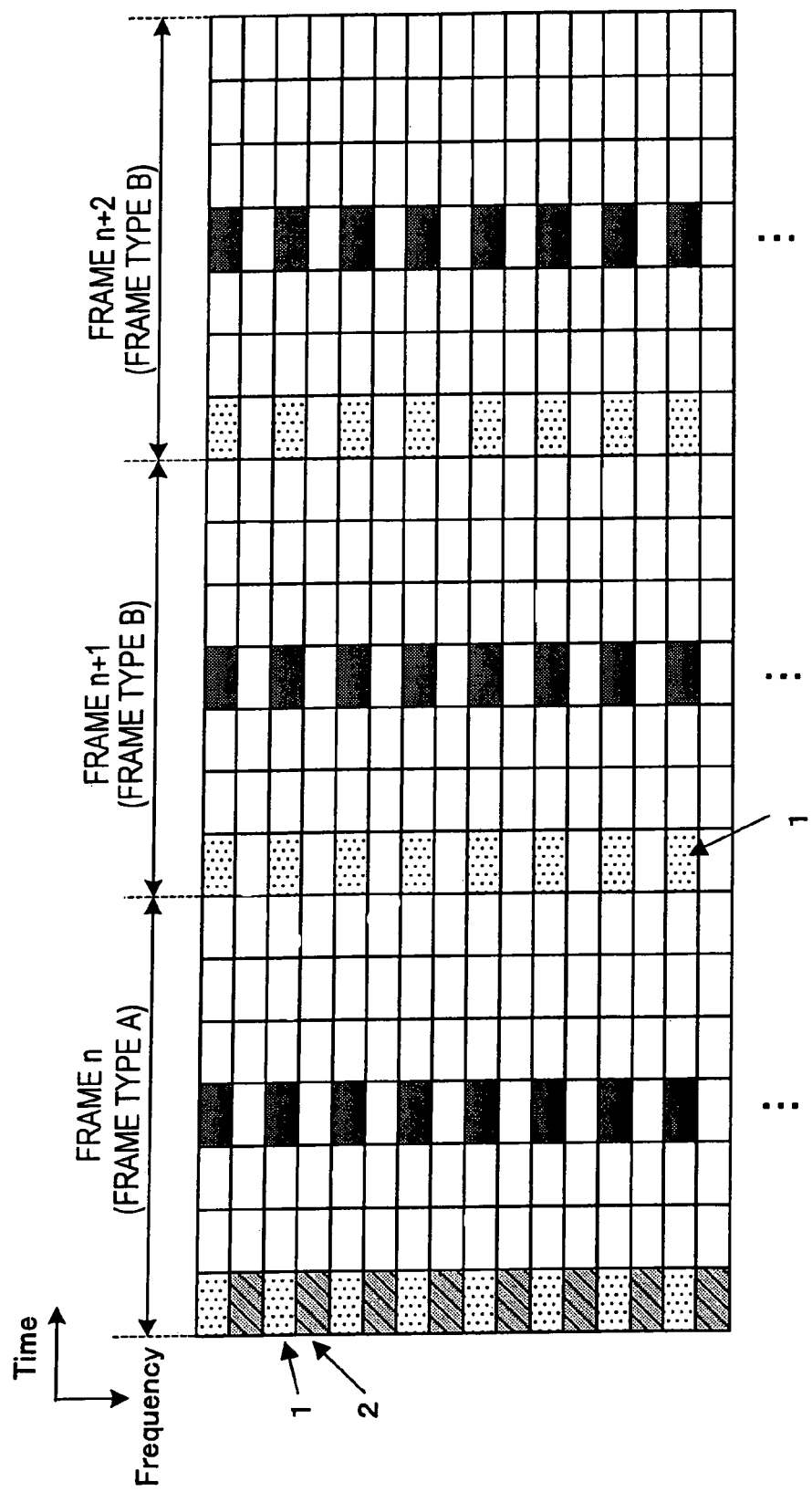
FIG. 5 is a diagram depicting an example (No. 1) of a frame type according to the present invention.
Figure 6:
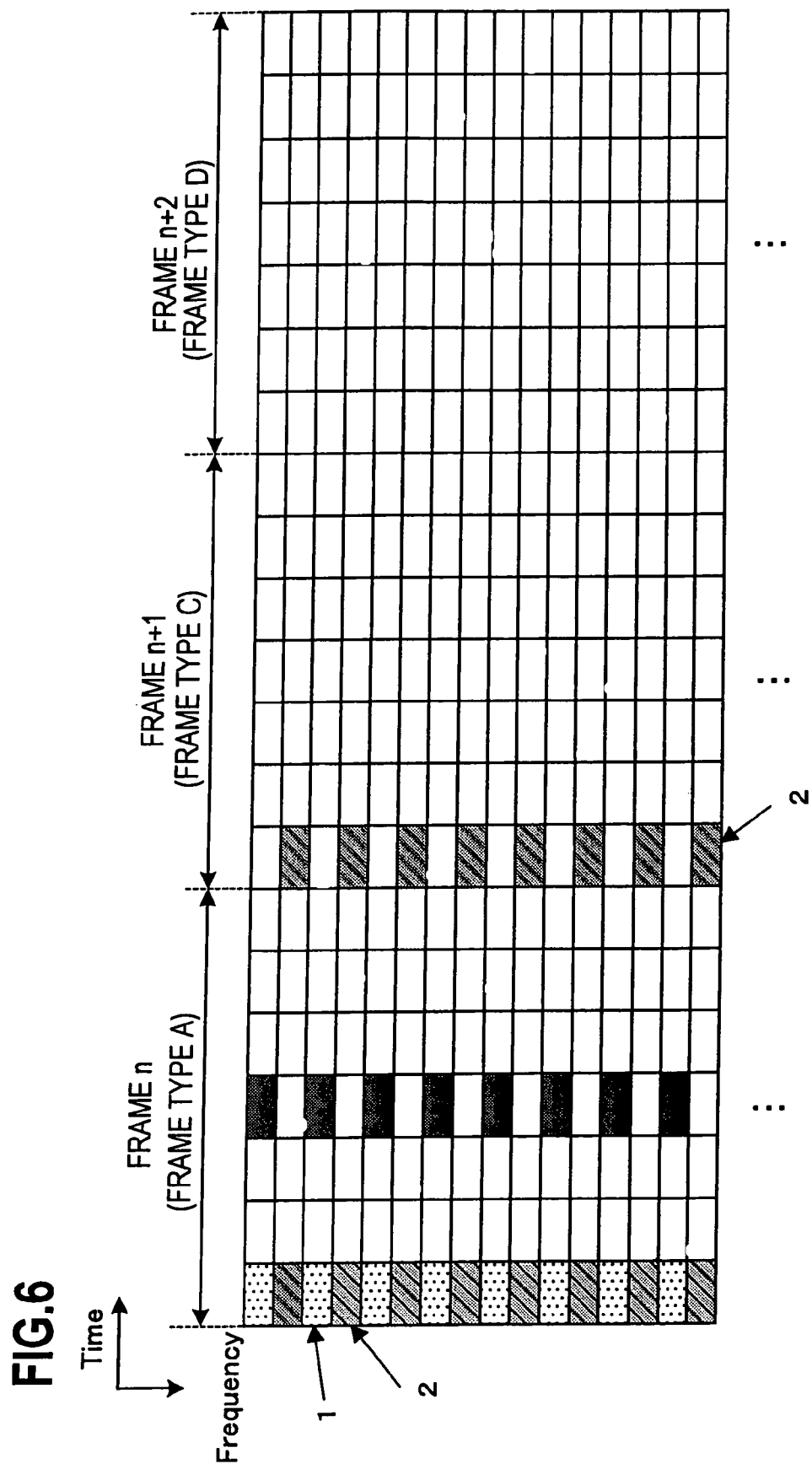
FIG. 6 is a diagram depicting an example (No. 2) of a frame type according to the present invention.

FIG. 5 and FIG. 6 are diagrams depicting examples (No. 1, No. 2) of the frame type according to the present invention.

In FIG. 5, a frame n is the frame type A shown in FIG. 1, which has the common pilot channel 1 and the control channel 2 in the beginning of the frame. User data is packaged in the other frame area.

In FIG. 5, a frame n+1 does not have any control channel 2, and is used as an area for further packaging user data. The data of this frame format is hereafter called "frame type B". Frame type B can package more data than frame type A, because the amount of the control channel area is open.

FIG. 5 is a configuration when there is one frame of frame type A, and subsequent frames are frame type B.

According to the frame format shown in FIG. 6, in a frame format after frame type A, the area of the common pilot channel 1 is filled with the data of user data, and only the control channel 2 and user data are packaged. This is hereafter called "frame type C".

In a frame format after frame type C, only user data is packaged, and neither the common pilot channel 1 nor control channel 2 is packaged. This is hereafter called "frame type D".

For the frame types shown in FIG. 5 and FIG. 6, a frame type is set in the transmission side apparatus 100 shown in FIG. 2 according to the control channel from the reception side apparatus 200, so as to perform transmission control.

Figure 7:
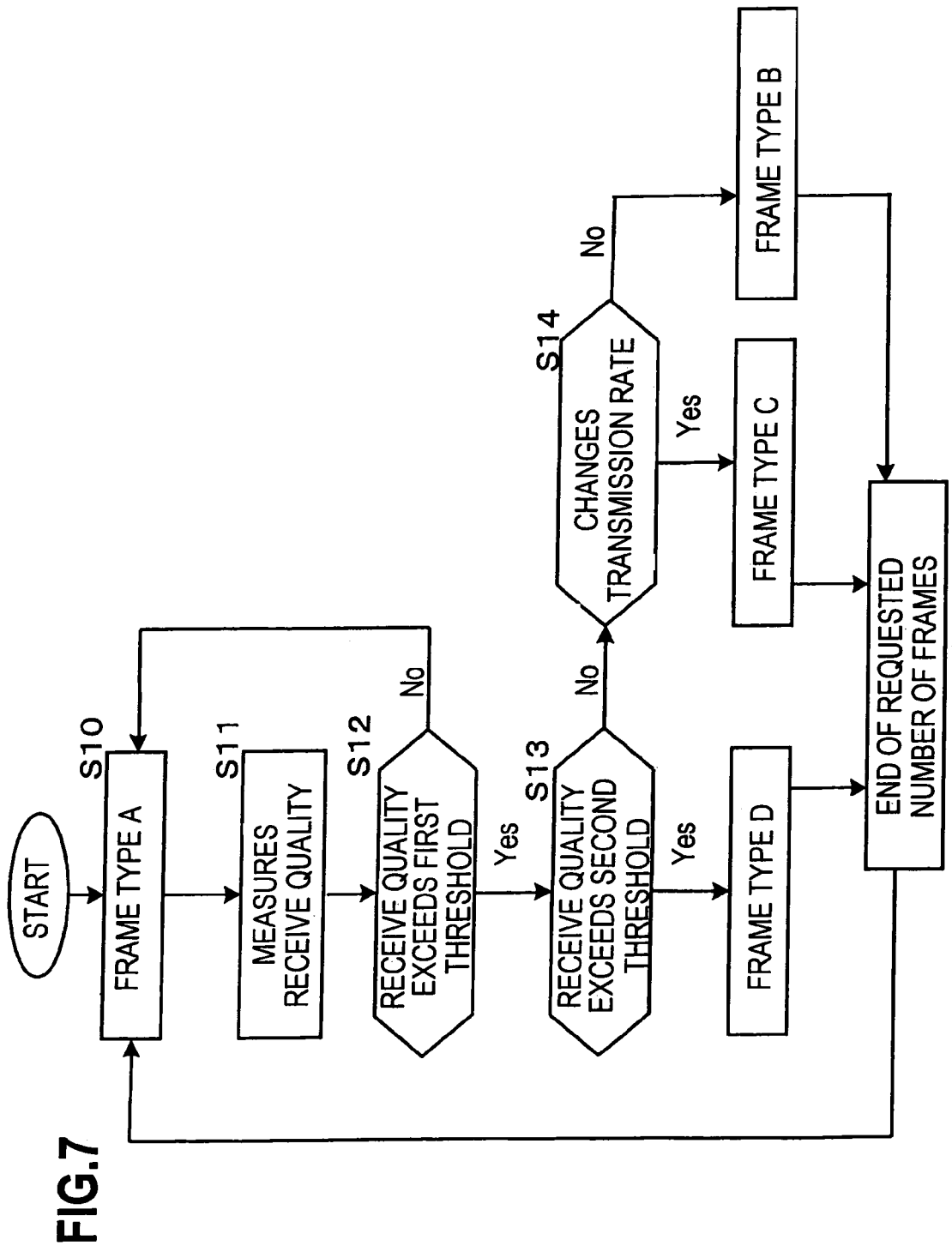
FIG. 7 is a flow chart depicting frame type decisioning.

In other words, if a frame format of frame type A is sent from the transmission side apparatus 100 to the reception side apparatus 200 in FIG. 4 (step S1), the reception side apparatus 200 decides a frame type to be used according to the processing flow shown in FIG. 7.

The above mentioned frame types can be applied according to the received quality.

A frame type and a number of frames are decided by the frame decision section 208 according to the received quality of the reception data, which is received by the reception side apparatus 200, and corresponding frame information is output.

FIG. 7 shows the flow of deciding the frame type. In FIG. 7, a signal of the frame type A, which is sent from the transmission side apparatus 100, is received (step S10). Based on the received signal of the frame type A, the received quality information generation section 207 measures the received quality (step S11).

In other words, when the frame type A (normal frame) is sent, the received quality is measured by averaging several frames, for examples (step S11).

Two types of thresholds (first threshold, second threshold) of the received quality are set in the frame decision section 208 in advance, and a frame type is decided by comparing the measured received quality and each threshold (steps S12, S13).

For example, if the propagation environment is poor when the moving velocity of the reception side apparatus 200 (mobile terminal) is fast, the received quality naturally becomes poor (first threshold or less: step S12, NO), and communication with frame type A is performed.

If the moving velocity of the reception side apparatus 200 becomes slower and then, received quality improves (first threshold or higher, and second threshold or lower: step S13, NO), frame types B and C are selected (step S14).

If the received quality becomes especially better, such as the case of stopping a mobile terminal (second threshold or higher: step S13, YES), communication with frame type D is performed.

Now frame types A, B, C and D are defined as follows, for example.

Frame type A (FIG. 5): normal frame (pilot CH+control CH+data CH)

Frame type B (FIG. 5): frame without control CH (Pilot CH+data CH)

Frame type C (FIG. 6): frame without pilot CH (control CH+data CH)

Frame type D (FIG. 6): frame only with data CH

In frame types B, C and D, each frame does not have a control CH or pilot CH, so data CH demodulation processing or received quality measurement processing is performed based on a control CH or pilot CH which was received last and is stored.

In the above frame type, if transmission capacity (throughput) for one user (assumed to be 2×7=14 symbols in a frame) is simply compared, the transmittable capacity when frame type D is used is about 1.27 times the case of frame type A.

Figure 8:
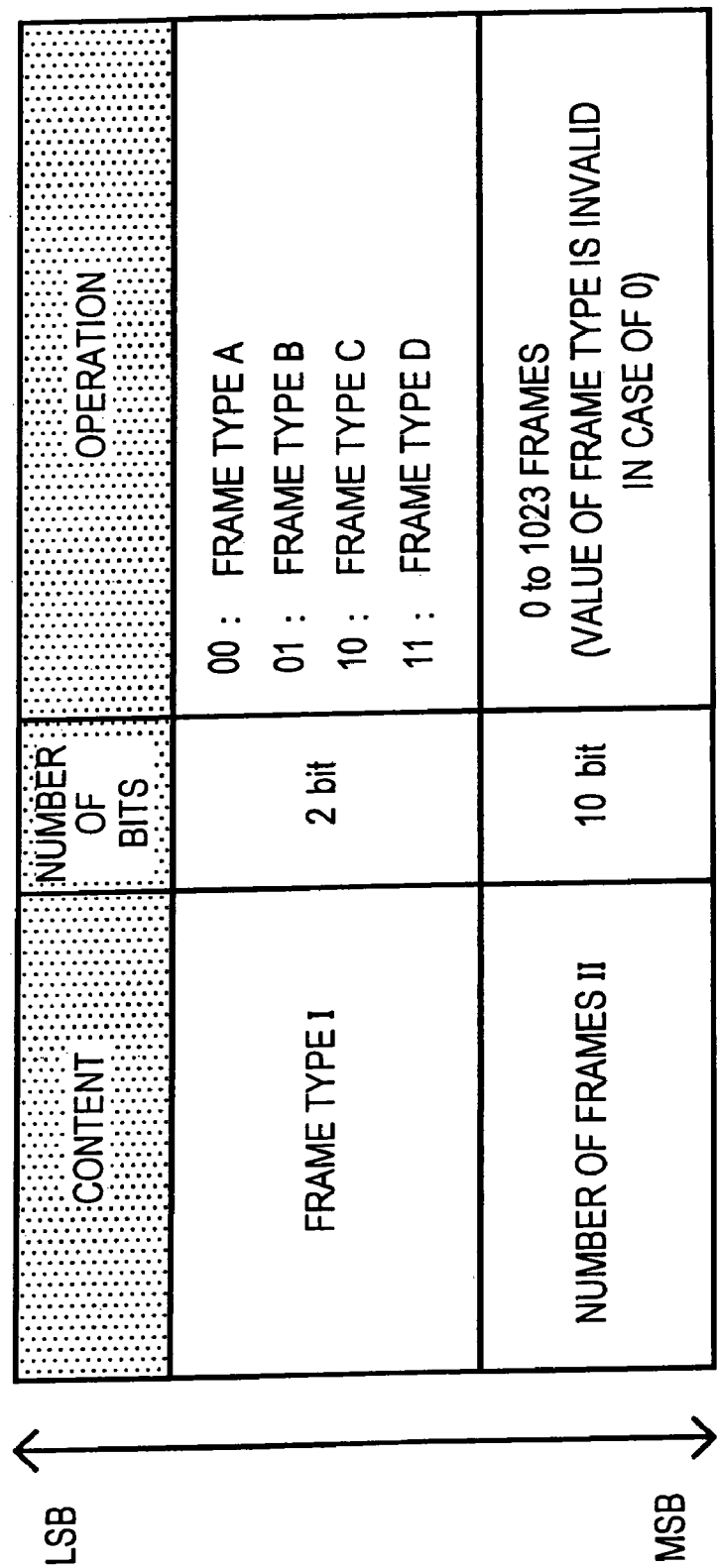
FIG. 8 shows an example of a notification frame which is sent from the reception side apparatus to the transmission side apparatus.

When the frame type is decided by the frame decision section 208, frame information is notified from the reception side apparatus 200 to the transmission side apparatus 100 by a notification frame of which example is shown in FIG. 8 (step S2: FIG. 4).

In other words, in the frame information shown in FIG. 8, frame type I and number of frames II are added to the control channel.

In the information to indicate frame type I, one of four types (frame type A to D) is assigned using two bits. In the information to indicate the number of frames II, 10 bits are assigned to notify the number of continuous transmissions of the decided frame type. The value of the frame type I is invalid if the number of frames is 0.

Here the number of frames II is a number of frames which can sustain the characteristics determined by comparison of the receive quality and the threshold of the receive quality, which is set in advance. For example, the number of frames which can sustain the characteristics is set in advance, in combination with the frame type I, corresponding to the threshold of the receive quality.

Then the transmission side apparatus 100 recognizes the frame information notified from the reception side apparatus 200, using the control channel demodulation/decoding section 111, and controls the transmission frame using the data generation section 101 and multiplex section 103 so as to correspond to this recognized frame information (step S3: FIG. 4).

Figure 9:
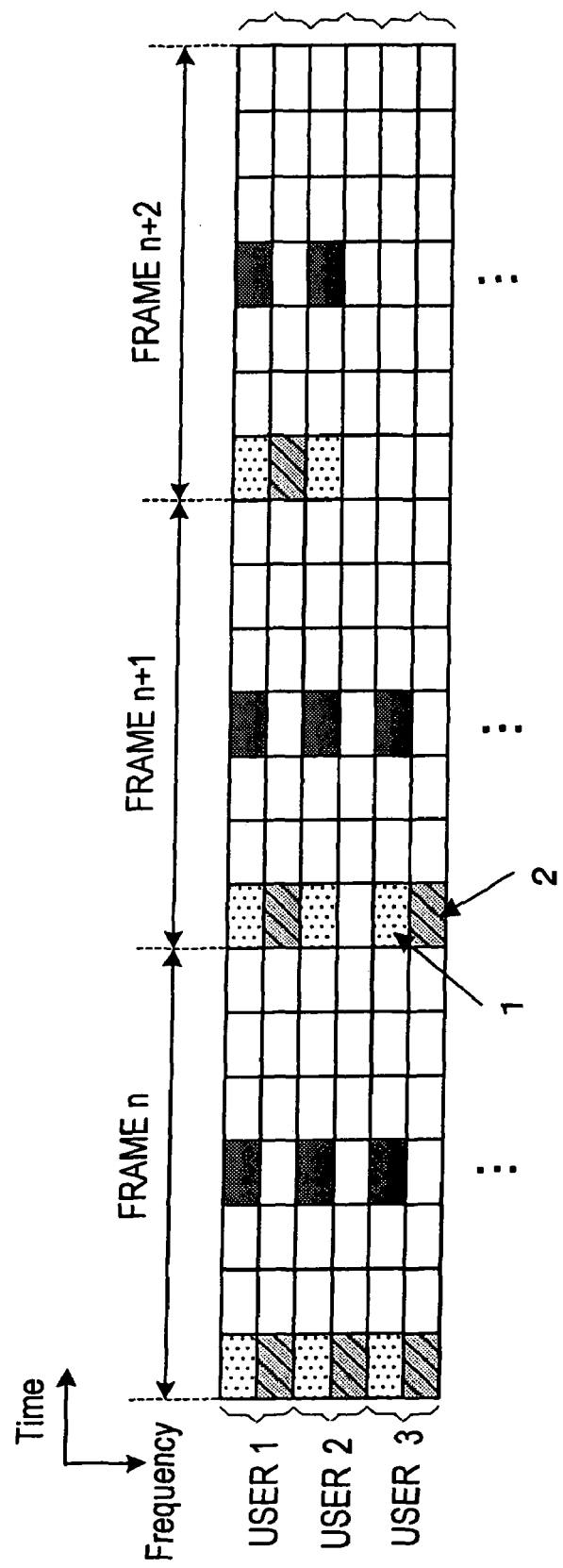
FIG. 9 is a diagram depicting an example of a frame format which is sent from the transmission side apparatus to the reception side apparatus.

FIG. 9 shows an example of the frame format which is sent from the transmission side apparatus 100 to the reception side apparatus 200 according to the above embodiment.

According to this frame format, the transmission side apparatus 100 (base station) uses a frame type depending on the state of each user.

User 1: transmits data from frame n using frame type A
User 2: transmits data from frame n+1 using frame type B
User 3: transmits data from frame n+2 using frame type D In this way, frame type may be used independently for each user.

In the above described embodiment, the receive quality is measured by the reception side apparatus (mobile terminal) 200, and requests the frame type and number of frames to the transmission side apparatus (base station) 100, but the base station side may decide the frame type and number of frames based on the received quality information which is fed back from the mobile terminal.

Also if transmission data volume from the base station side is small, a pilot CH is inserted and transmitted, instead of padding a data CH. The mobile terminal side uses the pilot CH, which is received last in each frame, for channel estimation measurement.

By providing a plurality of frame types, according to the transmission data volume, communication suitable for each mobile terminal apparatus can be performed.

Figure 10:
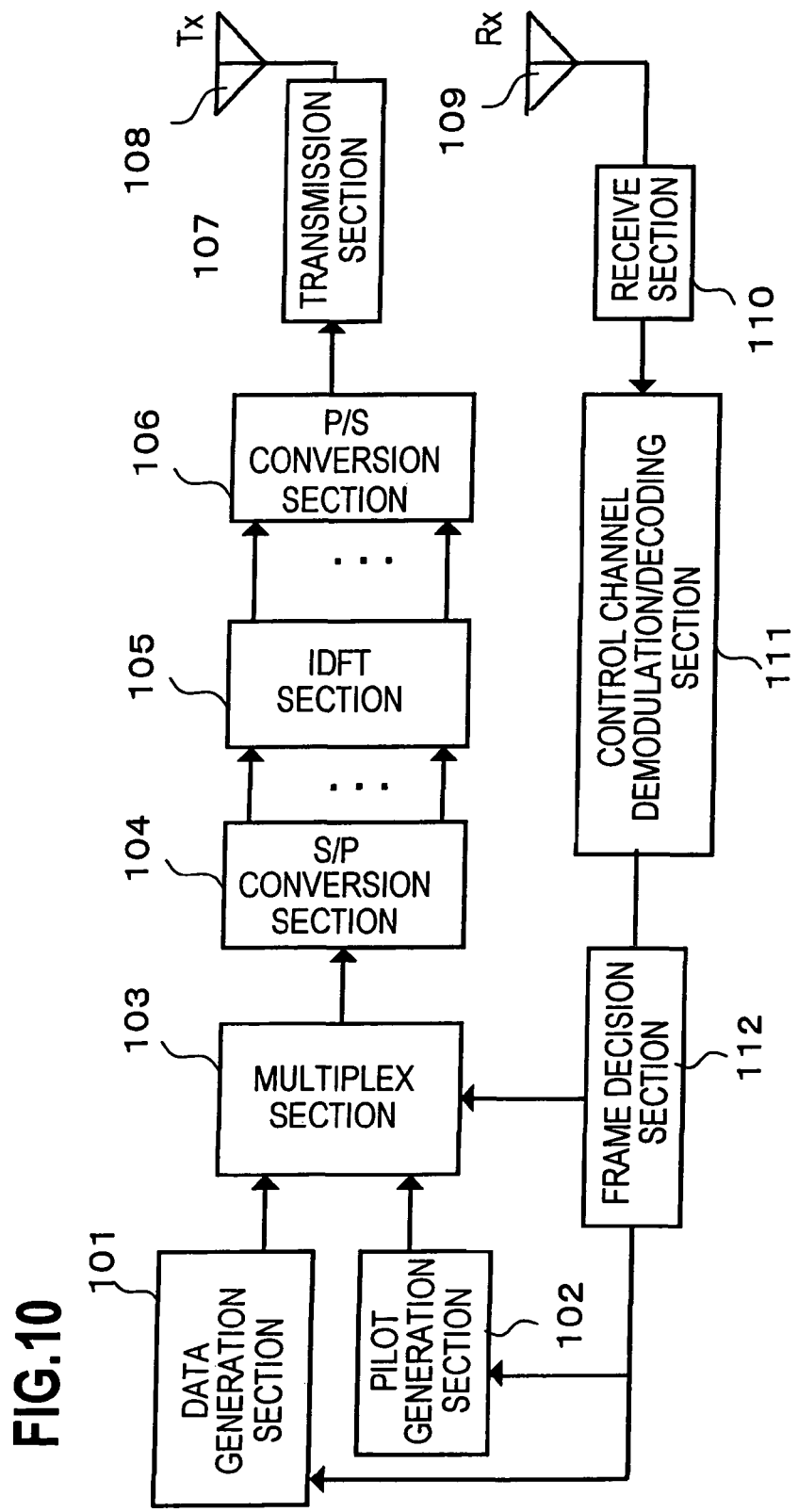
FIG. 10 is a block diagram depicting a configuration example of the transmission side apparatus according to the second embodiment.

FIG. 10 and FIG. 11 are block diagrams of a second embodiment depicting a configuration example of the transmission side apparatus 100 and the reception side apparatus 200 in the case when the transmission side apparatus (base station) 100 decides the frame type and number of frames based on the received quality information fed back from the reception side apparatus (mobile terminal) 200. FIG. 12 is a flow chart depicting a processing sequence between the transmission side apparatus and the reception side apparatus in the second embodiment.

The difference from the first embodiment is that the frame decision section 112 is in the transmission side apparatus 100 (FIG. 10). Therefore the reception side apparatus 200 does not have the frame decision section (FIG. 11).

In the processing sequence shown in FIG. 12, the transmission side apparatus 100 sends a normal frame format with frame type A (step S20). Therefore the received quality information generation section 207 of the reception side apparatus 200 generates information to indicate quality when the frame format with frame type A is received.

For example, a signal to noise ratio (SNR) is determined based on the channel estimation value. The received quality information generation section 207 may determine the bit error rate (BER) for another example. The determined received quality information is fed back to the transmission side apparatus 100 (step S21).

In the transmission side apparatus 100, the received feedback information is transferred to the frame decision section 112. The frame decision section 112 decides the frame type and number of frames which the reception side apparatus 200 requires when the data is received the next time, based on the feedback information on the receive quality, adds this to the control channel information in the transmission frame, and notifies it to the reception side apparatus 200 (step S23). By this, the reception side apparatus 200 can perform data demodulation processing according to the control channel information.

As described above, the present invention allows optimum transmission according to the propagation status of the user by making the frame type and number of frames variable for each user.

What is claimed is:

1. A transmission apparatus in a radio communication system for transmitting a data frame to a reception apparatus, wherein a plurality of continuous or discontinuous frequency areas are assigned to one transfer time block and the data frame is formed of a predetermined number of transfer time blocks, the transmission apparatus comprising:
a transmission unit configured to transmit a data frame which includes a common pilot channel and a control channel in the beginning of the data frame to the reception apparatus;
a reception unit configured to receive from the reception apparatus, quality information of the data frame received at the reception apparatus; and
a frame decision section configured to compare the received quality information with a threshold of received quality which is set in advance, and to decide a frame format which does not include at least the control channel and the number of frames that sustain the characteristics, wherein the transmission unit transmits to the reception apparatus, the data frame having the decided number of frames.

2. A reception apparatus in a radio communication system for receiving a data frame transmitted from a transmission apparatus, the data frame being formed of a predetermined number of transfer time blocks, each of which is assigned a plurality of continuous or discontinuous frequency areas, the reception apparatus comprising:
a reception unit configured to receive a data frame which has a common pilot channel and a control channel in the beginning of the data frame;
a measurement unit configured to measure received quality of the data frame;
a frame decision section configured to compare the measured received quality and a threshold of received quality which is set in advance to decide a frame format which does not include at least the control channel and the number of frames that sustain the received quality; and
a transmission unit configured to feed back information on the decided frame format and the number of frames to the transmission apparatus.

3. A transmission/reception method for a radio communication system comprising:
receiving, by a reception apparatus, a data frame which has a common pilot channel and a control channel in the beginning of the data frame sent from a transmission apparatus;
measuring, by the reception apparatus, received quality of the data frame;
comparing the measured received quality and a threshold of received quality which is set in advance to decide a frame format which does not include at least the control channel and the number of frames that sustain the received quality;
notifying information of the decided frame format and the number of frames to the transmission apparatus; and
sending, from the transmission apparatus, subsequent frame data to the reception apparatus by a frame format corresponding to the notified frame format.

* * * * *